Figure 1:
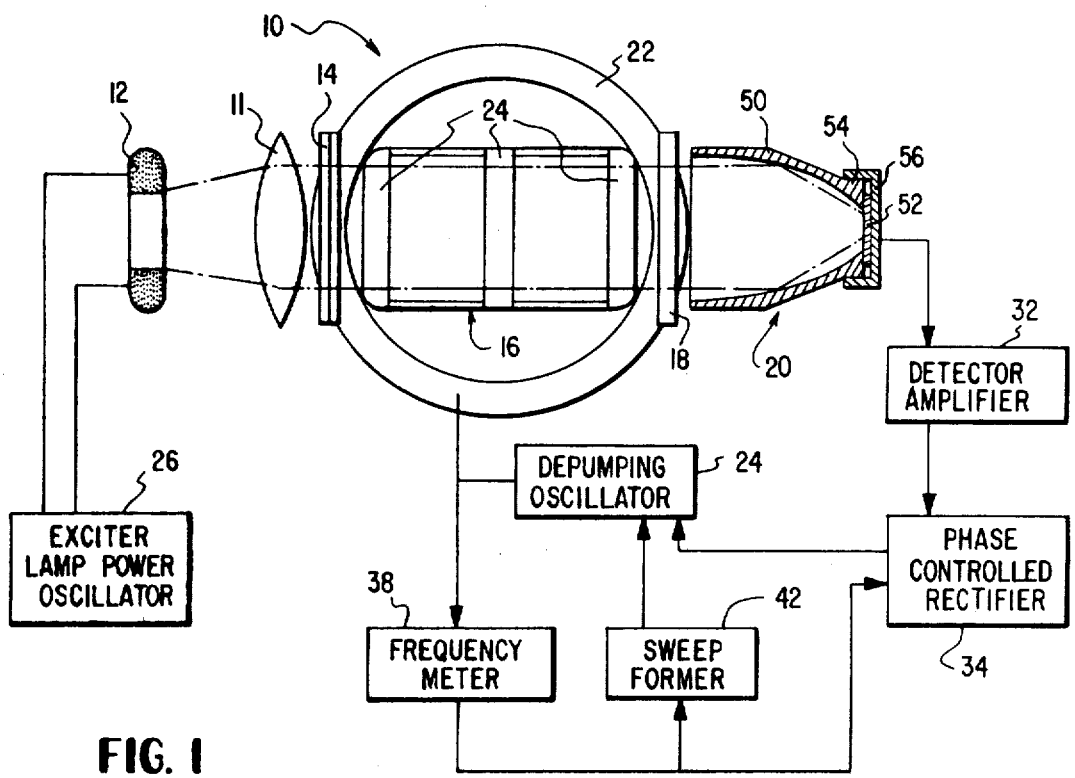

United States Patent

Hartline

[15] 3,701,005
[45] Oct. 24, 1972

[54] APPARATUS

[72] Inventor: Ralph E. Hartline, Tulsa, Okla.

[73] Assignee: Atlantic Richfield Company, New York, N.Y.

[22] Filed: Jan. 4, 1968

[21] Appl. No.: 695,785

[52] U.S. Cl. ............................................. 324/0.5 R
[51] Int. Cl. ............................................. G01r 33/08
[58] Field of Search ........ 324/0.5; 331/3, 94; 250/83, 250/83.3 IR, 216, 228

[56] References Cited

UNITED STATES PATENTS

| 2,402,662 | 6/1946 | Ohl | 250/216 |
| 2,790,081 | 4/1957 | Munday | 250/83 |
| 3,134,906 | 5/1964 | Henker | 250/228 |

OTHER PUBLICATIONS

J. A. Rice, Metastable Helium Sensitive Magnetometer, I.R.E. International Convention Record, 9(9), March 20–23, 1960, pp. 244–248.

Primary Examiner—Michael J. Lynch
Attorney—Martin J. Brown, W. Brown Morton, Jr., John T. Roberts, Malcolm L. Sutherland, John W. Behringer, Robert E. Lee, Jr., Eugene L. Bernard and James N. Dresser

[57] ABSTRACT

A device for measuring the intensity of minute magnetic fields comprising an optical magnetometer having a source for the emission of radiation, a radiation absorption cell means having the emitted radiation directed therethrough, and detector means for producing an output proportional to the intensity of impinging radiation from the source, wherein the detector means comprises a paraboloidal mirror and a detector element sensitive to the radiation and arranged within the mirror in a plane parallel to and in front of the latus rectum of the mirror, the open end of the mirror facing the cell means and having a diameter sufficient to receive the full beam of radiation passing through the cell whereby the radiation is collected by the mirror and directed toward the detector element.

12 Claims, 3 Drawing Figures

PATENTED OCT 24 1972

3,701,005

INVENTOR
RALPH E. HARTLINE

BY McLean, Morton & Boustead

ATTORNEYS.

APPARATUS

The recent advent of high sensitivity optical absorption magnetometers to measure minute fluctuations in the intensity of the earth's magnetic field has greatly expanded the ability of geophysical prospectors to locate and identify subterranean deposits of oil and precious metals. Furthermore, the precision of magnetic field detection by optical absorption magnetometers is so exact that such magnetometers permit airborne exploration of uncharted terrain, thereby greatly increasing both the speed of geophysical exploration and the ability of prospectors to reach remote and inaccessible terrain for geophysical examination.

The operation of optical absorption magnetometers, such as the metastable helium magnetometer, used in the system of this invention, is dependent upon the quantized nature of the absorption and radiation of energy of the atom. The "planetary" electrons of any atom can exist only in certain specific energy levels. In their lowest or ground state the electrons are stable. However, the electrons can be excited to certain specific and higher energy states by supplying to the system the exact quantity of energy equal to the difference between the higher and the original state. The electron can exist at the higher state for a time which can be found by statistical considerations. As the excited electron returns to a "permissible" lower state the atom radiates an amount of electromagnetic energy equal to the energy difference involved in the transfer. It is significant that the frequency of this radiation is directly proportional to the energy difference.

Helium is of particular interest in magnetometry because it has atomic excitation states in which the energy differences are particularly suitable for measurement with the aid of recently developed optical pumping methods. Other suitable materials for use in optical magnetometers include the alkali metals such as sodium, rubidium and cesium. For illustration, however, this invention will be described with reference to a helium magnetometer although it is not limited thereto. The operation of the helium magnetometer involves transitions between a pseudo ground energy state, the metastable state and the first excited state of the P spectral series. This first excited state has three sublevels so that the spectral line resulting from these transitions has three closely spaced components. These correspond to the 1.083 micron wavelength spectral line of helium. Under the action of a magnetic field the metastable state is divided into three Zeeman sublevels while the three substates of the first excited state are divided into one, three and five Zeeman sublevels.

When a population of helium atoms in the metastable state is exposed to the 1.083 micron resonance radiation of helium in a magnetic field certain of the atoms absorb radiation quanta and are excited to specific allowable substates of the first excited state. Excitation with light of random polarization results in a certain distribution of atoms between the substrates of the first excited state which may be designated as normal. In subsequently returning to the allowable substrates of the metastable state, these atoms radiate the equivalent energy change as 1.083 micron resonance radiation. The resulting distribution of atoms between the substates of the metastable state also achieves a form that may also be designated as normal.

By irradiating helium atoms in the metastable state with a beam of circularly polarized light parallel to the magnetic field, certain allowable transitions are affected to the exclusion of others. This results in an abnormal distribution of the population of atoms between the several substates of the first excited state. This change of distribution of energy between the substates as a result of irradiation by circularly polarized light is a form of optical pumping. Upon return to the metastable state through allowable transitions from this abnormal, pumped distribution, the resulting distribution in the metastable state becomes abnormal. In effect the initial optical pumping accomplished in the first or absorption transition is carried on to the second or radiation transition.

Insofar as optical magnetometry is concerned, it is only the abnormal distribution resulting in the metastable state that is of interest. The difference in energy and hence the quantum equivalent frequency difference between the two Zeeman substates of the metastable state is proportional to the strength of the magnetic field. In fact, it is a fraction consisting of the ratio of small integers, determined by the Lande "g" factor, times 14.0 cycles per second frequency change per gamma change in the magnetic field flux density. When circularly polarized resonance radiation is used for optically pumping in helium the greater amount of the stored energy is in the substates for which the Lande "g" factor is 2/1. Thus the effective energy difference between the Zeeman sublevels has a quantum frequency equivalent of 28.0 cycles per second change of frequency per gamma change of the magnetic field. If the frequency equivalent for the pumped energy storage in the metastable state can be determined, the intensity of the magnetic field flux in which the pumped atoms are found can be determined in gammas simply by dividing this frequency by the conversion factor 28.0 cycles per second per gamma flux density.

The irradiation of the helium sample with the circularly polarized 1.083 micron resonance radiation decreases the stability of the atoms in the metastable substates which are in a position to absorb quanta for excitation to the several substates of the first excited state. Additionally the continued irradiation reduces the stability in these receiving substates so that return to pumped condition in the metastable condition occurs at an accelerated rate. As a consequence there is no substantial accumulation of atoms in the abnormal distribution of the first excited state. This means that the collection of energy by optical pumping in this state is not very great. However, the atoms which return to the metastable state at the completion of the optical pumping portion of the cycle rest in positions that are relatively unaffected by the circularly polarized resonance radiation. The abnormality of the population of atoms in these substates continues to increase until the loss to each substate from other causes equals the gross pumping rate, that is until the net pumping rate is reduced to zero.

At the instant that the circularly polarized 1.083 micron resonance radiation is introduced to the sample of helium atoms, a large fraction of atoms are in metastable substates capable of absorbing these resonance quanta. However, as these states are depleted by the continuation of the pumping process, the number of atoms in absorbing substates decreases so that the sample becomes increasingly transparent to the exciting radiation. The increase in the intensity of exciting radiation passing through the helium sample thus becomes a measure of the progress of the pumping operation.

The abnormal population developed in the metastable substates by the pumping operation reaches an equilibrium condition as previously noted. This abnormal equilibrium can be disturbed by reducing the stability of the condition by applying an electromagnetic field at the resonance frequency of this state. This is the quantum equivalent frequency of the Zeeman substates in which the abnormal distribution occurs and the frequency has been shown to be interpretable in the terms of the magnetic flux density. This electromagnetic probing field can be applied, for example, by passing a radio frequency current through coils appropriately placed near the test sample resonance absorption cell. As the appropriate frequency field is applied to the absorption cell, the stability of atoms in the pumped substates is reduced and their populations return toward their normal values. This depumping restores the population in the substates which absorb the resonance radiation and the pumping cycle starts over again.

The amount of depumping, and hence the subsequent increase in the absorption for the resulting pumping cycle will be greatest when the depumping frequency exactly corresponds to the Zeeman resonance frequency and will decrease as the depumping frequency increases above or decreases below this diagnostic frequency. It is thus apparent that a monitoring of the variation of intensity of the transmitted resonance radiation as the depumping field is applied to the system can be made to establish when the depumping frequency is identical to the wanted Zeeman frequency.

A helium metastable magnetometer logically divides into several separate units; a light source of helium resonance radiation, a circularly polarizing filter to provide a suitable excitation beam of the resonance radiation, an absorbing cell containing helium to be optically pumped to an abnormal distribution in the Zeeman substates, a depumping control oscillator supplying a radio frequency field to periodically restore this distribution to its normal condition, a light detector in the beam of resonance radiation effluent from the absorption cell to indicate the change in absorption of the resonance beam produced by the periodic depumping field, and a signal amplifier in the output of the detector circuit. The helium absorption cell is the basic element of the magnetometer and contains pure helium gas under reduced pressure.

In operation, the absorption cell is subjected to a high frequency field of sufficient intensity to excite some of the helium atoms to levels of the triplet series. In the normal decay from these excited triplet states the helium atoms reach the metastable first excited state of the triplet series from which the optical pumping cycle involved in the operation of the magnetometer starts. The light source provides light emitted at the excitation frequency of helium which is contained in the helium absorption cell. The depumping oscillator controls the release of helium atoms from the abnormally populated Zeeman substates of the metastable state. The frequency of this oscillator when adjusted to obtain a maximum "depumping" signal is a measure of the resonance frequency of the Zeeman substates and hence of the average strength of the magnetic field. It should be noted that the frequency of the resonance radiation of these Zeeman substates of helium is not measured directly but indirectly by observing the effectiveness of the oscillator in producing depumping from the abnormally occupied Zeeman substates. The detection of depumping, and thus the precise adjustment of the depumping oscillator frequency is accomplished by monitoring the signal produced by the excitation light detector. Lead sulfide cells are suitable for use as the detector. The small electrical signals developed in the detector by changes in the exciter beam intensity are then amplified to a useful level and applied to the control circuits including the signal amplifier.

In practice, the detection of the optimum depumping frequency can be accomplished by sweeping the frequency of the depumping oscillator periodically back and forth over the Zeeman resonance frequency and noting the oscillator frequency at which the fundamental component of the sweep rate frequency in the light detector output becomes zero. As an alternative to this frequency modulation, a field modulation system can be employed in which the strength of the field being measured can be made to periodically vary over a small range about its normal value by applying a small, low frequency, alternating current to a coil system with its axis in approximate alignment with the field being investigated.

Since the output signal upon which measurements of the magnetic field are based is developed according to the intensity of a light beam which is selectively, continuously absorbed and the overall level of energy of the signal is low, enhancement of the signal is desirable. Heretofore, it has been attempted to increase the magnitude of this signal either by increasing the intensity of the light beam from the light source or by increasing the length of the absorption path in the cell. While each of these methods is effective to some extent, each has its limitations, and the output signal magnitude can be enhanced only to a limited extent by either or both of them. Accordingly, it is desirable to find a means of further enhancing the output signal.

In accordance with the present invention, the signal output is improved by arranging the detector element within a light collecting system in which the detector element is mounted against a hole made by a transverse cut through a paraboloidal mirror, preferably a deep-type paraboloidal mirror.

In a preferred embodiment, the detector element can be mounted in a semi-permanent way in a heavy body, e.g., of metal such as aluminum or other material having a high thermal conductivity or a cap which slips over the rear of the paraboloidal mirror body in such a way that the sensitive area of the detector element is properly exposed to the hole made by the transverse cut and through which the parallel beam of rays entering the mirror pass after being reflected by the mirror surface. Several advantages are gained by this arrangement in that the detector element is almost completely shielded from pickup from stray fields by the metallic body of the paraboloidal mirror and the metallic cap covering the lead sulfide detector cell. The shielding extends over the full 360° solid angle except the angle subtended by the mirror opening as viewed from the absorption cell. This is an important advantage since the lead sulfide cells which can be used as the detector element are relatively high impedance devices and thus represent a circuit element most susceptible to electrostatic pickup. The detector element is shielded from higher frequency electromagnetic pickup for all frequencies for which the wall thickness exceeds the "-skin depth" for that frequency.

An additional advantage is gained when the paraboloidal mirror is used in combination with a filter, e.g., of the Fabry-Perot type arranged between the absorption cell and the mirror since the silvered surface of this filter is partially reflective of the radiation. When the filter is mounted with its silvered face toward the mirror, the combination of the paraboloidal mirror and the partially reflective filter form a cavity in which any radiation not striking the absorbing surface of the lead sulfide cell is subject to multiple reflection within the cavity and thus the possibility of its subsequently striking the detecting cell after multiple reflections is increased, thus increasing somewhat the detection efficiency of the system. Additionally, in the preferred deep paraboloidal mirror all reflections from its surface are made at angles of incidence (the angle between the ray and the normal to the plane of reflection) greater than 45°, with a substantial fraction approaching the glancing angle. This is advantageous since the coefficient of reflection of the mirror increases with increasing angle of incidence, and so the radiation collecting efficiency of the deep paraboloidal mirror is high.

The deep paraboloidal mirror can be preferably arranged with its aperture almost in contact with the absorption cell. The helium lamp, which produces the resonance radiation beamed through the cell for optical pumping and the variation of the intensity of which is to be monitored by the detector element, produces its light over a substantial volume of the lamp. The lamp therefore does not act as a point source but as a diffuse source and, for this reason, the columnating optical system which forms the beam through the absorption cell cannot produce a truly parallel beam but tends to spread and broaden as it passes through the cell. The aperture of the paraboloidal mirror extends forward of the detector cell to the absorption cell so that all light leaving the cell enters the mirror and has the possibility of being directed to the sensitive surface of the lead sulfide cell.

An additional advantage of this construction is that the mirror and detector element can act as a single unit so that no vibration resulting in relative motion between the cell and the mirror can occur. This prevents modulation of the beam reaching the detector element by vibration of the detector element with respect to the mirror and greatly reduces the spurious noise generated in the optical system. The spurious noise developed in the optical system is also reduced in the paraboloidal mirror because its aperture is mounted in close contact with the absorption cell. This permits this end of the absorption cell and the deep paraboloidal mirror to be mounted on a common supporting member, thus greatly reducing the possibility of vibration between them with an associated reduction in the possibility of spurious noise.

Figure 3:
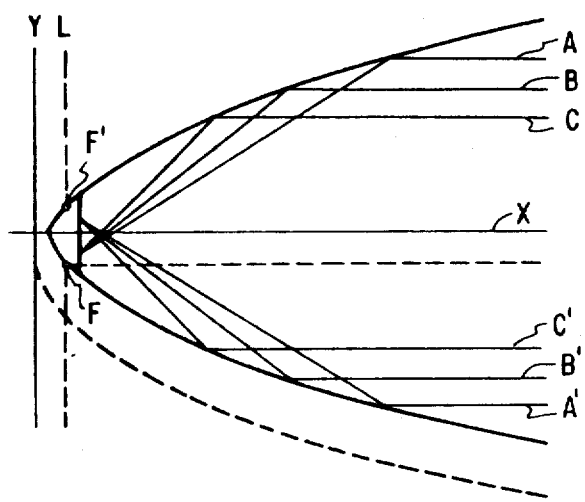
Figure 2:
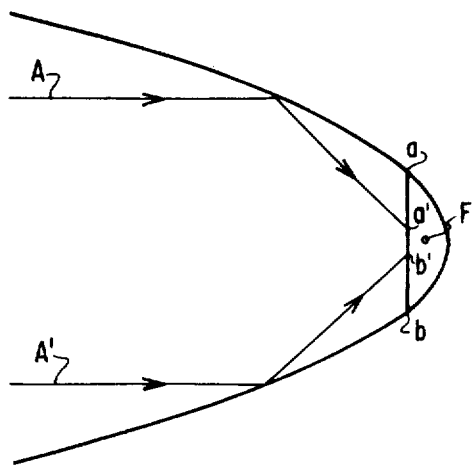

This invention and the objects thereof will be more fully understood from the following detailed description with reference to the attached drawings wherein FIG. 1 illustrates schematically a magnetometer system in accordance with this invention; and FIGS. 2 and 3 illustrate two modifications of mirrors suitable for this invention.

Referring now to FIG. 1, helium magnetometer unit 10 is shown for purposes of illustration although it is clear this invention can be used, for example, with alkalivapor magnetometers such as the sodium, rubidium and cesium magnetometers. The unit 10 generally includes helium exciter lamp 12, columnating lens 11, circular polarizing filter 14, absorption cell 16, narrow band optical filter 18 which passes the resonance radiation of helium, and detector unit 20. Helium atoms in cell 16 which have been raised to abnormal distributions in the Zeeman sublevels of the metastable state, e.g., by energizing electrodes 24, are depumped and released to the more highly absorbing normal distributions, by a signal supplied through a depumping coil 22 from an oscillator in a manner known to the art. The depumping is, therefore, associated with a decrease in the intensity of the light beam reaching detector unit 20 which includes a paraboloidal mirror 50, e.g., of polished aluminum and a detector element 52 arranged adjacent the base 54 of the mirror 50. A metal cap 56 covers detector element 52 and connects to base 54 of mirror 50. Mirror 50 collects the light in the beam passing through excitation cell 16 and directs it upon detector element 52 to produce an electrical signal corresponding to the intensity of the light beam passed through cell 16 which signal is then used to control the depumping frequency to obtain maximum depumping or absorption of light.

The detector element 52, which monitors the helium resonance radiation transmitted through the absorption cell 16, can be any of several such devices sensitive to helium resonance radiation, i.e., the 1.08 micron line of helium. Suitable devices are lead sulfide detectors as shown which are small, e.g., a one-fourth inch square, or photo-tubes.

The absorption cell 16 comprises a closed cylindrical vessel containing spectroscopically pure helium gas at a pressure such that the metastable helium atoms produced in the discharge have sufficient lifetime to permit an alignment. The helium in the cell is excited to produce atoms in the metastable state by, for example, a high frequency electric field, produced in the vessel by electrodes 24 fitted at each end of the vessel. The helium in the absorption cell can also, if desired, be excited by such means as a high frequency electromagnetic field. If a high frequency electromagnetic field is used, the electrodes referred to above are unnecessary. Another method suitable for producing metastable helium atoms in the absorption cell is through the use of a quantity of natural or artificial radioactive material placed inside or adjacent to the vessel. Additionally, X-rays generated without or within the vessel can be utilized for the production of metastable helium atoms. The cylindrical vessel is fabricated from a material such as glass which is transparent to the helium resonance radiation. If desired, the vessel may be constructed of an opaque material and provided with windows transparent to the resonance radiation. The absorption cell may be of any arbitrary shape, however, the preferred shape is that of the cylinder as shown.

The helium excitation lamp 12 is essentially a discharge tube similar in operation to the aforementioned discharge tube, i.e., absorption cell 16. The lamp 12 is electrically driven by exciter lamp power oscillator 26. Since the excitation lamp 12 is used to radiate resonance radiation, it is desired to excite the helium in the lamp 12 much more strongly than in the absorption cell 16. In operation, the helium excitation lamp 12 is energized from power oscillator 26 to radiate unpolarized radiation. However, the portion traveling along the optical path through absorption cell 16 is circularly polarized by circularly polarizing filter 14.

The electrical signal output of the detector element 52 is passed through a detector signal amplifier 32 where it is filtered to pass only the fundamental sweep frequency component. The output of amplifier 32 is applied to a phase controlled rectifier 34 which develops an error signal used to control the frequency of the depumping oscillator 24. The phase reference voltage required for the phase controlled rectifier 34 is derived from the timing circuit of frequency meter 38 which measures the frequency of the depumping oscillator 24.

Oscillator 24 applies a depumping signal to cell 16 through depumping coil 22. The depumping frequency applied to the absorption cell through coil 22 controls release of the helium atoms from the abnormal distribution in the Zeeman levels of the metastable state to the normal distribution of Zeeman levels in this metastable state. This frequency is adjusted until the fundamental component of the sweep rate frequency in the output of detector element 52 is reduced to zero. In order to determine the frequency at which maximum depumping occurs, the frequency of oscillator 24 is controlled, first by a signal from the phase control rectifier 34, and second by a signal from sweep former 42. As mentioned, the error signal output of phase control rectifier 34 is dependent upon the output signal of detector 20, as filtered by detector amplifier 32, and upon the phase reference voltage obtained from frequency meter 38. The output of sweep former 42 causes the frequency of depumping oscillator 24 to periodically sweep through a limited range, and the frequency is observed at which maximum depumping occurs in absorption cell 16, as measured by detector 20. This frequency is the desired indication of the magnetic field strength.

The sweep signal produced by sweep former 42 is preferably a square wave, but it can be of any desired shape such as a triangular wave or a sine wave, for example. Preferably the sweep wave should be symmetrical about its zero axis. It is only necessary to move the depumping oscillator frequency both above and below the proper frequency corresponding to the ambient magnetic field in order that the point of maximum light absorption in the absorption cell 16 may be sensed as evidenced by output from the phase detector 34. It is preferred to use a signal derived from the clock within frequency meter 38 to control the sweep frequency applied to the depumping oscillator 24. This permits measurement of the depumping frequency over an integral number of periods of sweep. When the sweep signal is not keyed to the frequency measuring intervals but started at any point in time and the depumping frequency measured over a period of time, the measurement does not necessarily include an integral number of sweep cycles and an error can develop in the measurement.

As mentioned above, detector element 52 is preferably mounted adjacent an aperture arranged in a plane $a-b$ parallel to the latus rectum of the paraboloid but placed in front of that plane. This condition is illustrated in FIG. 2. In this condition all rays such as A and A' outside a cylinder of diameter of the detector element will strike the sensitive surface $a'b'$ after one reflection from the parabaloid surface. Those rays inside the cylinder will strike the surface with no reflection.

The overall design of the paraboloidal mirror for use in an optical magnetometer involves consideration of several requirements. The outer opening of the paraboloid should have a diameter large enough to receive the full beam of modulated light transmitted by the absorption cell. This means that its opening must at least be equal to that of the absorption cell. To obtain a high sensitivity the detector area on which the full beam is finally concentrated by the mirror should be small so that the light density is high. Thus, the light beam is focused to impinge on a detector having a small area. It is preferable that the detector element fill the entire aperture formed in the parabaloid. The aperture made in the parabaloid is preferably in front of, that is, on the larger cross section side of the plane of the latus rectum. The overall length of the mirror should be compatible with the space limitations placed upon the magnetometer head.

Lead sulfide detectors having a sensitive surface of 0.16 inches square have been found to be suitable for a radiation detector in the helium optical magnetometer. In the preferred type, the sensitive area has conductive bands which divide the sensitive surface into three parallel connected areas, each having a current path as wide as the surface but each one approximately one third as long. Using this type of detector it is desirable to have the beam of radiation gathered by the paraboloidal mirror distributed relatively uniformly over the full sensitive surface of the lead sulfide radiation detector.

Since the size limitations applied to optical magnetometers are often times critically small, the surfaces of the mirror are preferably designed to effect a shortening of the required length thereof and at the same time to retain as near as possible the full reflecting characteristics of a paraboloidal surface. This is accomplished by forming the surface by rotating the simple parabola about an axis parallel to but not coincident with its principal axis.

It has been noted that the optical system is not required to produce a sharp optical image at the sensitive surface but rather a diffuse image of the source covering the full area of the sensitive surface, and this is one result of placing the sensitive surface ahead of the plane of the latus rectum. It is also apparent from FIG. 2 that every ray parallel to the principal axis of the paraboloid and above the position of the principal axis will also strike the sensitive surface $a'b'$ of the detector element above the principal axis. The whole upper limb of the parabola of revolution can, therefore, be moved downward by a constant value of $y$, not exceeding the distance aF or one half the length of the latus rectum chord, without throwing the reflected beam off of the lower half of the sensitive area. Consider the amount of this displacement to be $h$. The equation for the resulting parabola with respect to the same set of XY coordinate would be, $$(Y+h)^2=4pX.$$

Thus a new parameter, $h$, is introduced which has the effect of adding a new degree of freedom to the adjustment of the parabolic curve. This is made apparent in FIG. 3 wherein the parabola illustrated has its principal axis set at 1 unit length below the $x$ axis. Its principal axis is shown by the dashed horizontal line one unit below the $x$ axis. The focus for this parabola is at the point marked F on the principal axis. This parabola is shown by the solid parabolic curve above the $x$ axis and its continuation below the $x$ axis by the dashed curve. The three rays A, B and C drawn parallel to the principal axis come to a focus at the focal point F.

In accordance with this invention, however, the surface of a modified paraboloidal mirror is developed by rotating the parabola not about the principal axis but about the $x$ axis. As a result the modified parabaloid developed has symmetry about the $x$ axis and its section takes the shape of the solid parabolic curve below the $x$ axis. The lower part of this curve has its effective principal axis one unit above the $x$ axis and its focal point falls at F'. The three rays A', B' and C' falling on the lower section of the mirror thus converge at F'. By comparing FIG. 3 with FIG. 2, the advantage of this modified mirror becomes obvious. A shorter mirror provides an aperture of the same size for cylinders of radiation of equal size.

It is an important advantage of this invention to mount the detector element 52, e.g., lead sulfide cell in direct contact with the base 54 of the deep paraboloidal mirror. This provides the detector element good thermal contact with a massive body of high thermal conductivity. This thermal contact is further improved by the metal cap 56 in which the detector is mounted which in turn slides over the base of the paraboloidal mirror. In this manner the temperature of the cell can rise only a slight amount above its ambient temperature, that of the paraboloidal mirror and associated cell mounting cap.

It is claimed:

1. In a device for measuring the intensity of minute magnetic fields with an optical magnetometer having a source for the emission of resonance radiation, a radiation cell means having radiation emitted from said source directed therethrough to produce alignment of atoms in said cell, means to produce an alternating magnetic field in said cell of a frequency which diminishes the alignment of said atoms, and detector means for producing an output proportional to the intensity of impinging radiation from said source which passes through said cell, the improvement wherein said detector means comprises a paraboloidal mirror and a detector element sensitive to the radiation, said detector element being arranged within said mirror in a plane parallel to and in front of the latus rectum of the mirror, the open end of said mirror facing said cell means and having a diameter sufficient to receive the full beam of radiation passing through said cell whereby the radiation is collected by said mirror and directed toward said detector element, said detector element having a radiation sensitive area at least equal to the area of the cross-section of said mirror in said plane.

2. A device according to claim 1 including filter means intermediate said absorption cell means and detector means and forming a unit with said mirror.

3. The device of claim 1 wherein the reflective surface of the mirror is formed by rotating a simple parabola about an axis parallel to but not coincident with its principal axis.

4. The device of claim 1 wherein the open end of the parabaloid of the mirror has a diameter essentially equal to that of the cell means.

5. The device of claim 1 wherein said detector element is mounted at an aperture formed by a transverse cut in said mirror and having a size substantially equal to the cross sectional size of the detector element.

6. The device of claim 5 wherein the mirror includes cap means, the detector element being mounted in said cap means and arranged at said aperature.

7. The device of claim 6 wherein the mirror and cap means are of a material having a high thermal conductivity.

8. The device of claim 7 wherein the material is aluminum.

9. The device of claim 5 wherein the reflective surface of the mirror is formed by rotating a simple parabola about an axis parallel to but not coincident with its principal axis.

10. In a device for measuring the strength of a magnetic field comprising a contained body of helium gas the atoms of which are acted upon by said magnetic field when in the presence thereof; means to excite the body of helium gas for continuously producing metastable helium atoms; a source of resonance radiation impingeable upon and interacting with the body of helium gas for producing alignment of said metastable helium atoms contained therein; means to create and direct into the body of helium gas an alternating magnetic field of such frequency as to diminish the alignment of metastable helium atoms contained in the body of helium gas; and means to measure the changes in the amount of resonance radiation absorbed by said metastable helium atoms including means for detecting said radiation after passage through said gas, the improvement wherein said detecting means comprises a paraboloidal mirror and a lead sulfide infrared detector element sensitive to the 1.08 micron resonance line of helium, said detector element being arranged within said mirror in a plane parallel to and in front of the latus rectum of the mirror, the open end of said mirror facing said contained body and having a diameter sufficient to receive the full beam of radiation passing through said body whereby the radiation is collected by said mirror and directed toward said detector element, said detector element having a radiation sensitive area at least equal to the area of the cross-section of said mirror in said plane.

11. The improvement of claim 10 wherein the mirror is polished aluminum.

12. The device of claim 10 wherein the reflective surface of the mirror is formed by rotating a simple parabola about an axis parallel to but not coincident with its principal axis.

* * * * *